US010081261B2

(12) United States Patent
Grimes et al.

(10) Patent No.: US 10,081,261 B2
(45) Date of Patent: Sep. 25, 2018

(54) HIGH-VOLTAGE BATTERY OFF-BOARD CHARGERS

(71) Applicant: FORD GLOBAL TECHNOLOGIES, LLC, Dearborn, MI (US)

(72) Inventors: Jeffery R. Grimes, Canton, MI (US); Benjamin A. Tabatowski-Bush, South Lyon, MI (US); William David Treharne, Ypsilanti, MI (US); Jonathan Andrew Butcher, Farmington, MI (US); Robert John Link, Northville, MI (US); Xuemei Sun, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 567 days.

(21) Appl. No.: 14/503,530

(22) Filed: Oct. 1, 2014

(65) Prior Publication Data
US 2016/0096438 A1 Apr. 7, 2016

(51) Int. Cl.
*H02J 7/00* (2006.01)
*B60L 11/18* (2006.01)

(52) U.S. Cl.
CPC ....... *B60L 11/1816* (2013.01); *B60L 11/1825* (2013.01); *B60L 11/1838* (2013.01); *B60L 2230/12* (2013.01); *B60L 2240/80* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/163* (2013.01)

(58) Field of Classification Search
USPC ........................................................ 320/109
See application file for complete search history.

(56) References Cited

U.S. PATENT DOCUMENTS

| 5,596,258 | A  | * | 1/1997 | Kimura | ................. B60L 3/0084 320/109 |
| 7,084,361 | B1 | * | 8/2006 | Bowes | .................. B60L 3/0069 200/16 R |
| 7,692,401 | B2 |   | 4/2010 | Gonzales et al. | |
| 8,199,449 | B2 | * | 6/2012 | Kuschnarew | ....... B60L 11/1887 307/10.1 |
| 8,319,472 | B2 |   | 11/2012 | Gibbs et al. | |
| 8,593,789 | B2 | * | 11/2013 | Jung | ........................ B60L 3/12 361/601 |
| 2008/0100259 | A1 |   | 5/2008 | Tabatowski-Bush | |
| 2008/0315830 | A1 |   | 12/2008 | Bertness | |
| 2009/0073624 | A1 | * | 3/2009 | Scholer | ................ B60L 3/0069 361/88 |

(Continued)

FOREIGN PATENT DOCUMENTS

WO 2012115455 A2 8/2012

*Primary Examiner* — Samuel Berhanu
(74) *Attorney, Agent, or Firm* — David Kelley; Brooks Kushman, P.C.

(57) ABSTRACT

A vehicle charging system includes a charger configured to receive power form an external power source and a connector. The connector is configured to receive power from the charger and transmit the received power to a vehicle via a high-voltage cable. The cable is configured to connect the connector to a vehicle battery. Each of the charger and the connector includes a high voltage interlock loop (HVIL) configured to cause the charger to cease power transfer upon recognizing a predetermined voltage difference at a pair of ports of the HVIL.

11 Claims, 5 Drawing Sheets

(56) References Cited

U.S. PATENT DOCUMENTS

| | | | |
|---|---|---|---|
| 2009/0256523 A1* | 10/2009 | Taguchi | B60L 11/1816 320/109 |
| 2009/0309551 A1* | 12/2009 | Lazarovich | H02J 7/0073 320/138 |
| 2010/0010698 A1* | 1/2010 | Iwashita | B60L 3/12 701/22 |
| 2010/0123573 A1* | 5/2010 | Cawthorne | B60L 11/1838 340/532 |
| 2010/0271168 A1* | 10/2010 | Niedzwiecki | H01H 9/102 337/194 |
| 2011/0029144 A1* | 2/2011 | Muller | B60L 11/1816 700/293 |
| 2011/0062798 A1* | 3/2011 | Tarchinski | B60L 3/00 307/328 |
| 2011/0127944 A1* | 6/2011 | Saito | B60L 11/1824 320/101 |
| 2012/0080938 A1* | 4/2012 | Rutkowski | H01M 2/1077 307/9.1 |
| 2012/0146582 A1* | 6/2012 | Lei | B60L 11/1824 320/109 |
| 2012/0181983 A1* | 7/2012 | Khan | B60L 11/1816 320/109 |
| 2012/0313562 A1* | 12/2012 | Murao | B60L 3/0046 318/139 |
| 2013/0020993 A1* | 1/2013 | Taddeo | H02J 7/0027 320/109 |
| 2013/0127415 A1* | 5/2013 | Ohtomo | B60L 3/003 320/109 |
| 2013/0214738 A1* | 8/2013 | Chen | H02J 7/02 320/109 |
| 2014/0015482 A1* | 1/2014 | Nitzberg | B60L 11/1816 320/109 |
| 2016/0303986 A1* | 10/2016 | Park | B60L 11/18 |
| 2017/0292982 A1* | 10/2017 | Acena | G01R 31/005 |

* cited by examiner

HIGH-VOLTAGE BATTERY OFF-BOARD CHARGERS

TECHNICAL FIELD

This disclosure relates to high-voltage battery off-board chargers for vehicles.

BACKGROUND

Hybrid vehicles may have two energy sources including a fuel source and a battery source. The high-voltage battery may be used to provide enough power to start an engine of a vehicle. The fuel source may in turn charge the battery when a charge level of the battery falls below a certain threshold. When a fault occurs in the vehicle, the battery charge may be consumed during an attempted start of the vehicle. When the battery state of charge is extremely low, the battery may need to be replaced. However, the high-voltage battery may not be faulty and replacing it may result in unnecessary costs to the manufacturer, the dealership, and the customer.

SUMMARY

A vehicle off-board charger includes a charger component that receives power from an external power source and transfers the received power to a vehicle, and a gateway that communicates with the vehicle via a vehicle connection, receives controller area network (CAN) information from a vehicle controller, and in response to the CAN information indicating charge complete or fault detected, ceases the transfer of power of the charger component.

An off-board charger for a vehicle includes a gateway controller that communicates with a vehicle battery controller and a charger component of the charger. The controller receives battery information from the vehicle, transmits a constant voltage request to the charger component in response to the battery information, receives a battery contactor status from the battery controller, transmits current instructions to the charger component in response to the battery contactor status indicating closed contactors, receives battery charge information from the controller, and transmits a zero voltage message to the controller in response to the battery charge information indicating battery charge is complete.

A vehicle charging system includes a charger that receives power form an external power source, and a connector that receives power from the charger and transmits the received power to a vehicle via a high-voltage cable. The cable is configured to connect the connector to a vehicle battery. Each of the charger and the connector includes a high voltage interlock loop (HVIL) that causes the charger to cease power transfer upon recognizing a predetermined voltage difference at a pair of ports of the HVIL.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

When a vehicle battery state of charge is extremely low, the battery may not be capable of starting the vehicle. Often times this leads servicemen and technicians to replace the battery. However, replacing the battery may be expensive and time consuming. Described herein is an off-board battery charger having controller area network (CAN) capabilities. Such CAN capabilities may permit the charger to communicate with a battery energy control module (BECM) within the vehicle to obtain battery information, and automatically initiate and stop charging by sending and receiving diagnostic messages.

The charger may be capable of detecting and displaying charging system faults during charging by interfacing with the battery controller and the electric vehicle supply equipment (EVSE). Further, the charger may implement a high-voltage interlock loop (HVIL). The charger may provide a universal, user friendly device that reduces the amount and frequency of battery replacements, saving time, money and environmental effect.

Figure 1:
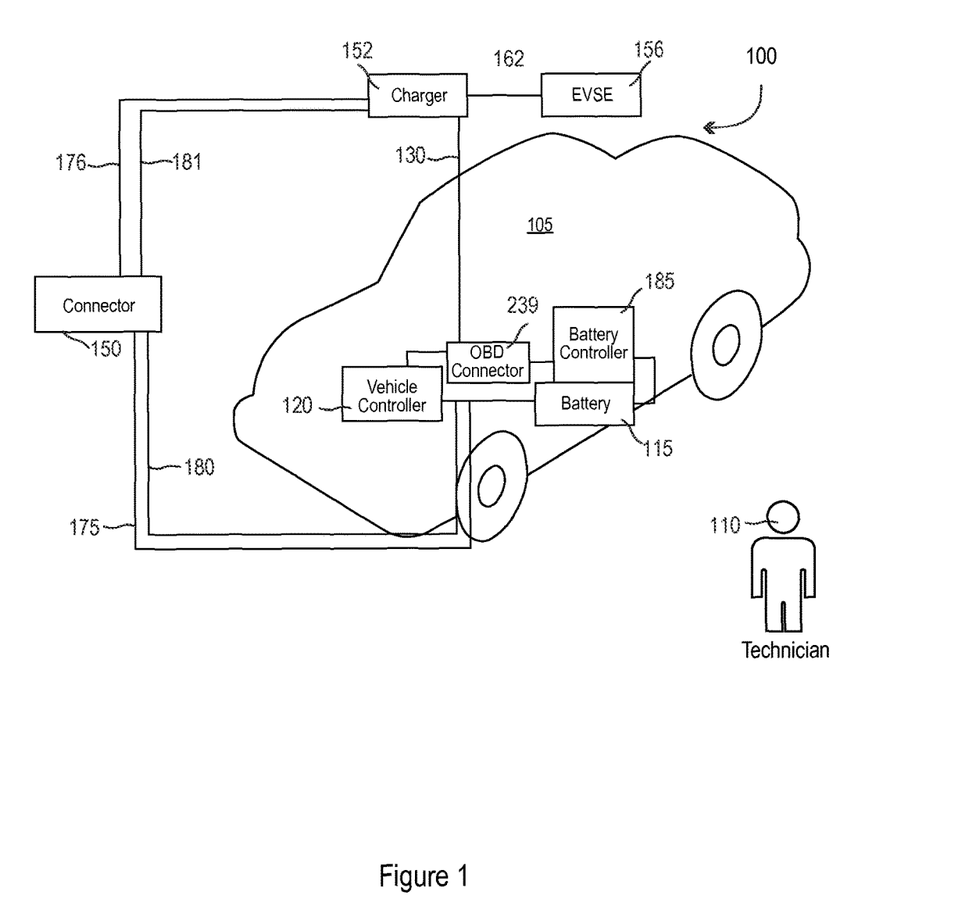
FIG. 1 illustrates a high-voltage charging system.

FIG. 1 illustrates a high-voltage charging system 100 for a hybrid vehicle. The system 100 may include a high-voltage battery 115 within a vehicle 105. The high-voltage battery 115 may include a battery pack and may store energy to be used by the electric motors of the vehicle 105. The battery 115 may provide a high-voltage DC output. The battery 115 may include contactors (not shown), referred to as main contactors below. The main contactors are controlled by a battery controller 185, to connect or disconnect the high-voltage DC output from the vehicle. The battery 115 may be electrically connected to the electric motors and may provide the ability to bi-directionally transfer energy between the battery 115 and the motors. For example, a typical battery 115 may provide a DC voltage while the electric motors may require a three-phase AC current to function. In addition to providing energy for propulsion, the battery 115 may provide energy for other vehicle electrical systems.

The battery controller 185 may include a processor and a memory, and may control and monitor the performance of the battery 115, such as the battery state of charge (SoC), battery current, battery temperature, and battery voltage. The controller 185 may also open or close the main contactors inside the battery 115 to disable or enable the power flow from the battery 115. During service, the battery controller 185 may also transmit battery data to the charger 152 and receive the diagnostic request information from the charger 152 via an on board diagnostic (OBD) cable 130 using controller area network (CAN) communication. In some examples, the battery controller 185 may be a battery energy control module (BECM).

A vehicle controller 120 may include a processor and a memory. The vehicle controller 120 may contain a high-voltage connector (ports shown in FIG. 2), which includes high-voltage ports to receive the high-voltage from the battery 115, and HVIL ports to detect high voltage interlock loop open fault. In some examples, the vehicle controller 120 may be an inverter controller, DC converter, etc. During service to charge the high-voltage battery 115, the high-voltage connector 121 (shown in FIG. 2), which is easier to access than the battery connector 222, is disconnected from the vehicle controller 120 and connected to a charger connector 150.

The charger 152 may include an on board diagnostics (OBD) cable 130 to connect the charger 152 and the battery controller 185 to facilitate CAN communication. The charger 152 may include a display 405 (shown in FIG. 4) configured to present diagnostic information to a technician 110. The information may include charging information or battery information either received from the battery controller 185 or detected by the charger 152. Such data may include the charging current, the state of charge of the battery 115, charging state, fault information of the charging systems, etc. Data and instructions may be displayed on the charger 152. The display 405 may be an integrated screen. The display 405 may also be included in a stand-alone device such as a computer, tablet, or other device. The display may also be an audio output such as a speaker.

The charger 152 may be configured to interface with the charger connector 150 via a charger high-voltage cable 181 and HVIL cable 176, and with the electric vehicle supply equipment (EVSE) 156 via an EVSE cable 162. The charger 152 may convert the AC power received from the EVSE 156 to DC power. The DC power is transmitted to the battery 115 during charging via high voltage cables 180 and 181. The charger 152 may also detect and respond to a high-voltage interlock loop open fault, as discussed in detail in FIG. 2.

While the charger 152 is described herein as being managed by the technician 110, the charging system 100 may also be operated by other high-voltage trained personnel such as dealers, repair personnel, etc.

The electric vehicle supply equipment (EVSE) 156 is used to connect the charger 152 with the power grid. It may handshake with the charger 152 to connect the AC power to the charger 152.

The connector 150 may be a device configured to interface with the charger 152 via the charger high voltage cable 181 and the HVIL cable 176. The connector 150 in turn may connect to the battery 115 via the high-voltage cable 180 and connect to a vehicle high voltage interlock loop via HVIL cable 175.

Figure 2:
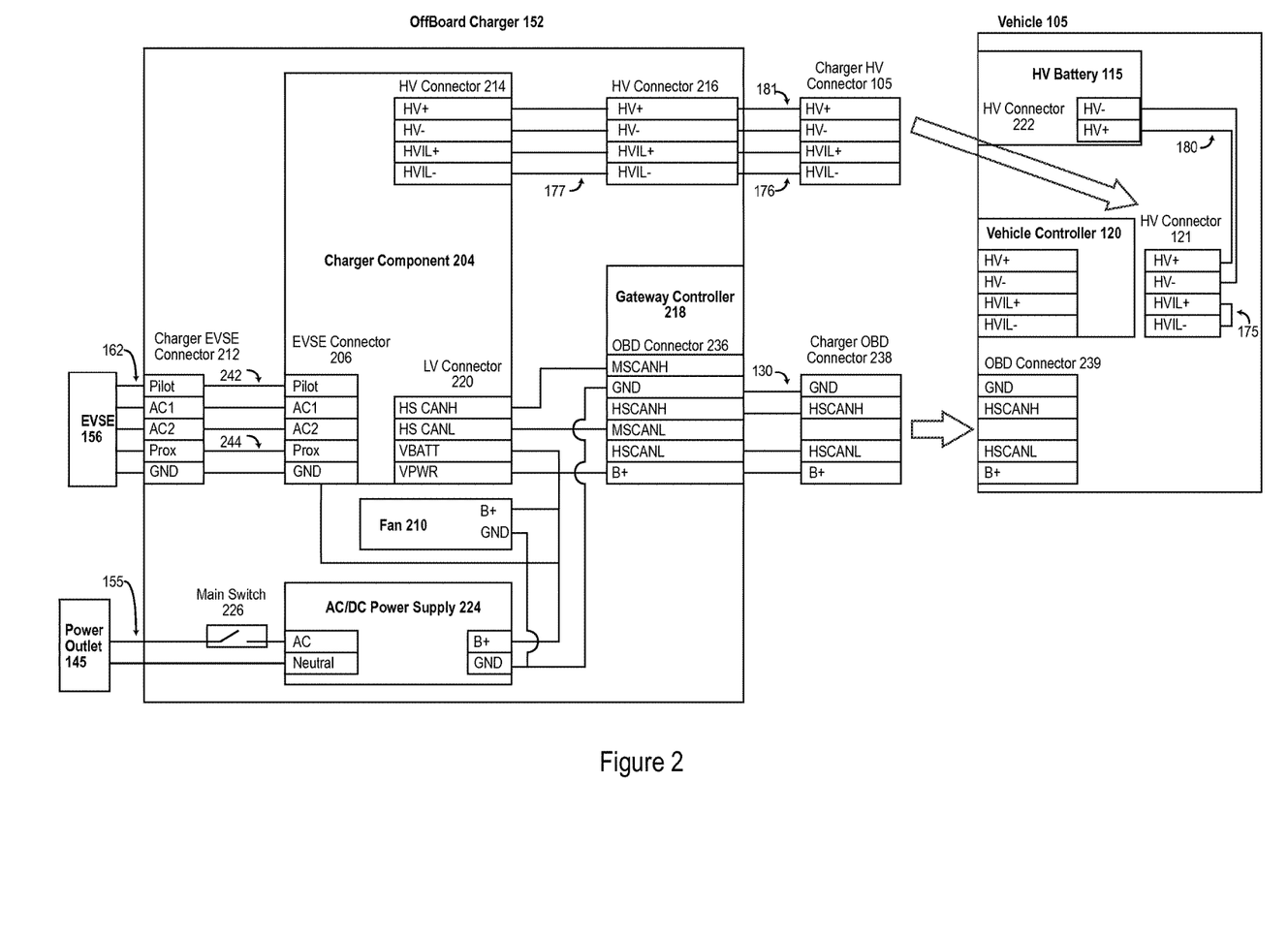
FIG. 2 illustrates a block diagram of the charging system.

FIG. 2 illustrates a block diagram of the charging system 100. The charging system 100 includes the charger kit and its connections to the vehicle 105 and EVSE 156. The charger kit includes the off-board charger 152, the high voltage cable and its connector 150, the OBD cable and its connector 238, and the EVSE connector 212. The connection between the charger kit and the EVSE 156, and the connection between the charger kit and the vehicle 105 are discussed above in FIG. 1.

The charger 152 may include several components to facilitate and integrate with existing EVSE systems and other vehicle systems. The charger 152 may include the charger component 204, a fan 210 to air cool the charger component 204, a gateway controller 218, an AC/DC power supply 224, a main switch 226, and a few connectors to facilitate charger connection: EVSE connector 212, OBD connector 236, and high voltage connector 216.

The charger component 204 may include an EVSE connector 206 for receiving inputs from the charger EVSE connector 212. The EVSE cables between connector 212 and 206 are implemented to meet J1772 standard to facilitate the handshake between the EVSE 156 and the charger component 204. The EVSE connector 212 is connected to the EVSE 156 during battery charging.

The charger component 204 may include a component high-voltage connector 214, which is connected to the charger connector 150 via an optional connector 216. The cables between connector 214 and 150 may be long enough such that the charger connector 150 could be connected to the vehicle HV connector 121. The component HV connector 214 may include a high-voltage port to deliver the power from the charger component 204 to the battery 115 through a high-voltage cable 180. The component HV connector 214 may also include HVIL ports, which is used by the charger component 204 to detect high voltage interlock loop open fault.

The charger component 204 may also include a component power connector 220. The component power connector 220 may include a pair of CAN ports used by the charger component 204 to communicate with the battery controller 185 and the gateway controller 218. The component power connector 220 may also include the power ports (VBatt and VPWR) to receive power from the AC/DC power supply 224 to power up the charger controller 204.

The AC/DC power supply 224 may convert the AC power from the power outlet 145 to the DC power to power up the charger component controller 204, the gateway controller 218 and the cooling fan 210. A switch 226 may be arranged to switch on or off the power supply 224.

Figure 4:
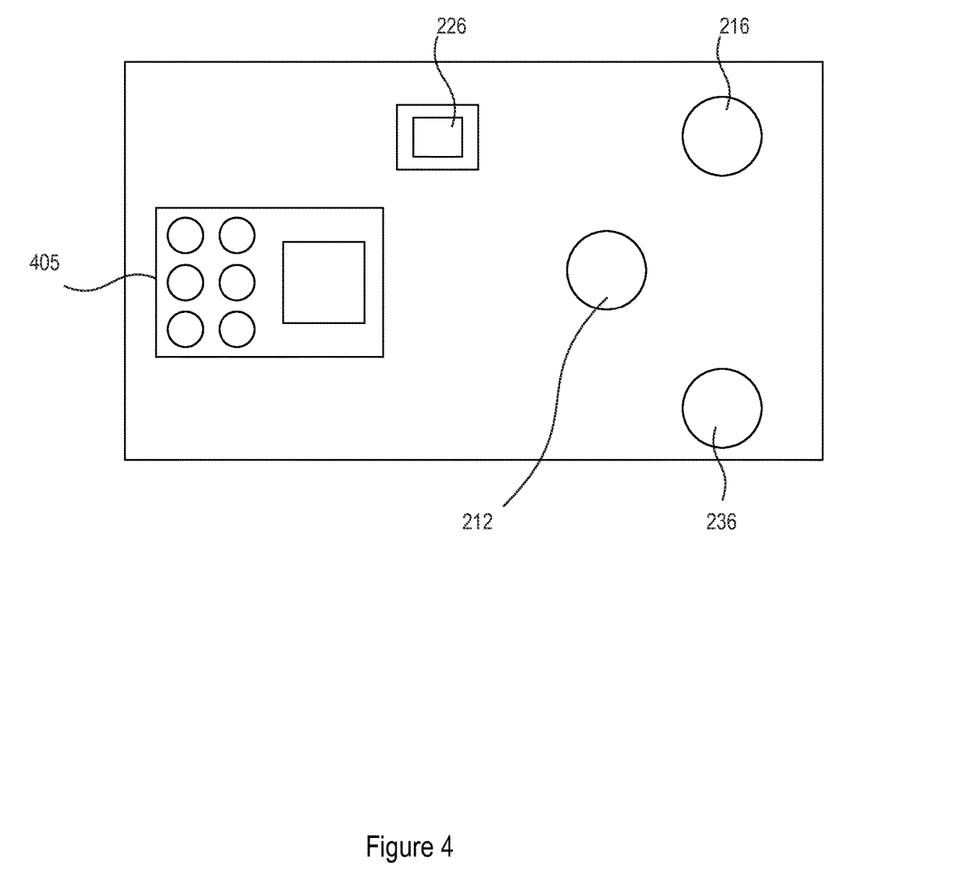
FIG. 4 illustrates an off-board charger for the charging system.

The gateway controller 218 may be configured to communicate with the charger component 204 and the battery controller 185 via the OBD connector 236. The gateway 218 may receive battery information from the battery controller 185, and may control charging by requesting the charger component 204 to deliver desired charging current and voltage. The gateway 218 may also present charging information and/or display fault information received from the charger component 204 and the battery controller 185 to the technician 110 via a display 405 included in the charger 152. The gateway 218 may also transmit diagnostic request message to the battery controller 185 to enter the diagnostic charging routine. The detailed charging sequence is illustrated in FIG. 4.

The high-voltage interlock loop (HVIL) described herein are low voltage circuits which may permit a low voltage to travel between several high-voltage connectors inside the vehicle 105 and the charger 152. During charging service, the charger OBD connector 238 is connected to the vehicle 105, and the high-voltage connector 121 is disconnected from the vehicle controller 120 and connected to the charger connector 150, as shown in FIG. 1. The HVIL may now include the portion inside the vehicle 105 and the portion inside the charger 152. The HVIL on the vehicle side, seen from vehicle HV connector 121, is closed when the circuit wire is not faulted and those high-voltage connectors inside the vehicle are fully seated. The HVIL on the charger side consists of a second HVIL cable 176 and 177, and the charger high voltage connector 216, charger connector 150, and the component HV connector 214 on charger component 204. If all these high voltage connectors are fully seated and the circuit wire is not faulted, the HVIL on the charge side is closed. When the high voltage interlock loop is closed, the voltage level measured at HVIL+ and HVIL− of the connector 214 by the charger component 204 is the same and in an expected range. If any of the high voltage connectors (i.e., connector 214, 216, 150, and 121) is open, the voltage measured at HVIL+ and HVIL− of the connector 214 by the charger component 204 will be different or not within the expected predefined range, and hence the charger component 204 may detect HVIL open fault. For example, if the voltage levels at HVIL+ and HVIL− of a connector differ by more than 2V, the HVIL may detect open fault.

When the charger component 204 detects the high voltage interlock open fault, it stops outputting DC power and transmits the high voltage interlock open fault to the gateway controller 218. The gateway controller 218 then transmits exit charging service routine request to the battery controller 185. The battery controller 185 first stops battery 115 outputs by opening the main contactors inside the battery 115, and then exits the charging service routine.

Figure 3:
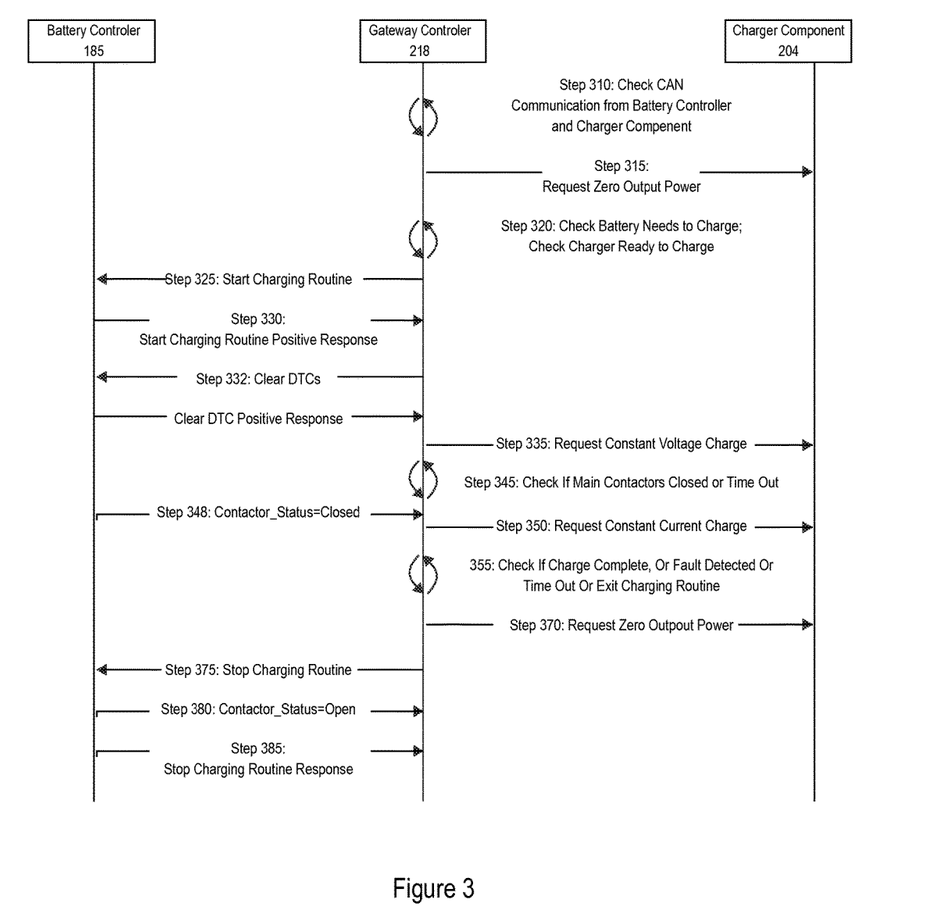
FIG. 3 illustrates a sequence flow for a charging process of the charging system.

FIG. 3 illustrates a process 300 for the charging system 100 including the battery controller 185, gateway controller 218, and charger component 204.

At step 305, after an initial set-up of the charging system (e.g., connect the charger connector 150 to the vehicle connector 121, the EVSE 162 to the charger 152, and the charger OBD connector 238 to the vehicle 105, the charger AC/DC power supply 224 to the power outlet 145), the vehicle 105 is started and the battery controller 185 is powered on. After the main switch 226 (shown in FIGS. 2 and 4) is turned on, the charger component 204 and the gateway 218 are powered up. At step 310, the gateway 218 may determine if CAN communications are received from the battery controller 185 and the charger component 204. If the gateway 218 detects a loss in communication with either the battery controller 185 or the charger component 204, it may inform the technician 110 with a loss communication message on the display 405 and stop the process 300. Otherwise, the process 300 may proceed to step 315.

At step 315, the gateway 218 may transmit a request to the charging component 204 to cease DC power output. This request may include instructions to deliver a current of 0 A.

At step 320, the gateway 218 may determine whether the battery information indicates that the battery 115 needs to be charged. The gateway 218 may determine this based on whether the battery SOC or pack voltage received from the battery controller 185 exceeds the predefined charge complete value. If the gateway 218 determines that the battery 115 does not need to charge, the gateway 218 may display a charge complete message on display 405 and the process 300 may stop. The gateway 218 may also determine whether the charger component 204 is ready to charge via the CAN messages received from the charger component 204. If the charger component 204 is not ready to charge, such as it has not received AC power, the gateway 218 may display a charger not ready message on the display 405 and the process 300 may stop. Otherwise, the process 300 may proceed to step 325.

At step 325, the gateway 218 may send a diagnostic request to the battery controller 185 requesting the battery controller 185 to enter the charging service routine. At step 330, the battery controller 185 may return a positive response if all the entry conditions are met. The entry conditions may include but are not limited to (1) battery pack voltage is within the pre-defined charging range, such as greater than the minimum allowed pack voltage and less than the predefined charge complete voltage; (2) battery controller 185 does not lose communication with the gateway 218; (3) vehicle gear is in park position; and (4) battery controller 185 does not have the faults that prevent closing the main contactors within the battery 115, except the faults caused by the battery over discharge, such as low battery SOC fault or low battery voltage fault. If all the charging routine entry conditions are met, the battery controller 185 enters the charging routine and sends the gateway 218 the positive response at step 330. Otherwise, the battery controller 185 returns a negative response and the gateway 218 displays the charge fail information on display 405 and stops the process 300

At 332, the gateway 218 may send a diagnostic message to the battery controller 185 to request it to clear diagnostic trouble codes (DTC). The battery controller 185 may first disable certain DTCs caused by the battery 115 over-discharge, such as battery voltage or SOC over-discharge DTCs. These DTC may cause the battery controller to open high voltage cable by opening the main contactors inside the battery 115. In order to charge the high voltage battery 115, these codes should be disabled, so as to not interfere with the servicing process. Then the BECM 185 may clear the DTCs that were set, and return to the gateway 218 with a positive response.

At step 335, after the positive response is received from the battery controller 185, the gateway 218 may transmit a constant voltage charging request to the charger component 204. The request may include a request that the charger component 204 delivers an output voltage matching the battery pack voltage. The request may additionally include a request of power output, such as charge current of 0.1 A. Such requests may cause the bus voltage (that is, the pack voltage measured by the battery controller 185 on the vehicle bus) to ramp up to match the battery pack voltage. When battery controller 185 detects the bus voltage matches the battery pack voltage, it closes the main contactors inside the battery 115.

At 345, the gateway 218 may check the main contactors status received from the battery controller 185 and monitor if a charge idle timer has timed out. A charge idle timer may time-out if a length of time has been exceeded. That is, if the charging routine has been running in excess of the predefined length of time, the charge idle timer may time out. In this case, the process 300 may stop and the gateway 185 may instruct the display 405 to show a charge fail idle time out message and proceed to step 370. If the charge idle timer does not time out and the main contactors are closed, the process 300 proceeds to step 350.

At 350, the gateway 218 may instruct the charger component 204 to charge the battery 115 using constant current charge method. One example to charge the battery 115 with the constant current charge method is to request the charge component 204 to deliver output voltage 5v higher than the charge complete voltage and the charging current of 5 A.

At 355, the gateway 218 may continuously monitor the information received from battery controller 185 and the charger component 204 via CAN communication to determine if charging is complete, or a certain defined fault is detected, or charging timer has timed out, or the battery controller 185 exits the charging routine. If any of these charging conditions is true, the process proceeds to step 370. One example of charge complete is the battery 115 pack voltage reaches to the voltage corresponding to 50% SoC. The battery controller 185 may open the main contactors inside the battery 115 and exit the charging service routine if a certain battery fault is detected, such as charge current is higher than expected or cell temperature too high. The gateway 218 may check if the battery controller 185 is in the charging routine periodically after the charging routine is entered by transmitting report charging service routine status request. The battery controller 185 may respond with a positive response if in the charging service routine or negative response if not. The entry conditions described above may be similar to the charging conditions but instead of checking for the conditions prior to initiating the charging routine, the charging conditions may be continually checked during the routine.

At 370, the gateway 218 may transmit instructions to the charger component 204 to request the charger component 204 to stop charging by outputting zero power.

At step 375, the gateway 218 may instruct the battery controller 185 to exit the charging routine. The battery controller 185 may first open the main contactors inside the battery 115 at 380, then send the gateway 218 the charging routine exit response, and finally exit the charging service routine. When the battery controller exits the change service routine, all the DTC detection should be re-enabled.

At various times during the charging routine, the gateway 218 may present the technician 110 with the charge information via the display 405. Examples of the information are listed below in Table 1.

TABLE 1

Alerts:

The battery controller loss CAN communication
The charger component loss CAN communication
Charging fault detected by the battery controller
Charging fault detected by the charger component
Charger not ready to charge
Battery controller not able to entry charging routine
Charging current not match the requested value
Bus voltage not match battery pack voltage during charging
Charging Information:

CHARGING
CHARGE_COMPLETE

FIG. 4 illustrates an off-board charger 152 for the charging system according to one embodiment. The charger 152 may include a display 405 for displaying information to the technician 110. The display may include a screen, as well as input buttons. The screen may be a touch-screen configured to receive user input. The charger may also include the main switch 226 configured to activate the charging component 204 and the gateway 218, as described above. The charger 152 may also receive the charger HV cable 181, the EVSE cable 162 and the OBD cable 130. The charger 152 may include power supply cable 155 (shown in FIG. 2) to connect to the power outlet 145.

The charger 152 may also include an indicator configured to indicate when the charger 152 is in use. That is, the indicator may indicate when the charger 152 is operating within the charging routine. The indicator may be included in the display 405 where the display presents a message or image indicating the charging routine is operating. The indicator may also include a light emitting diode configured to illuminate during use.

Figure 5:
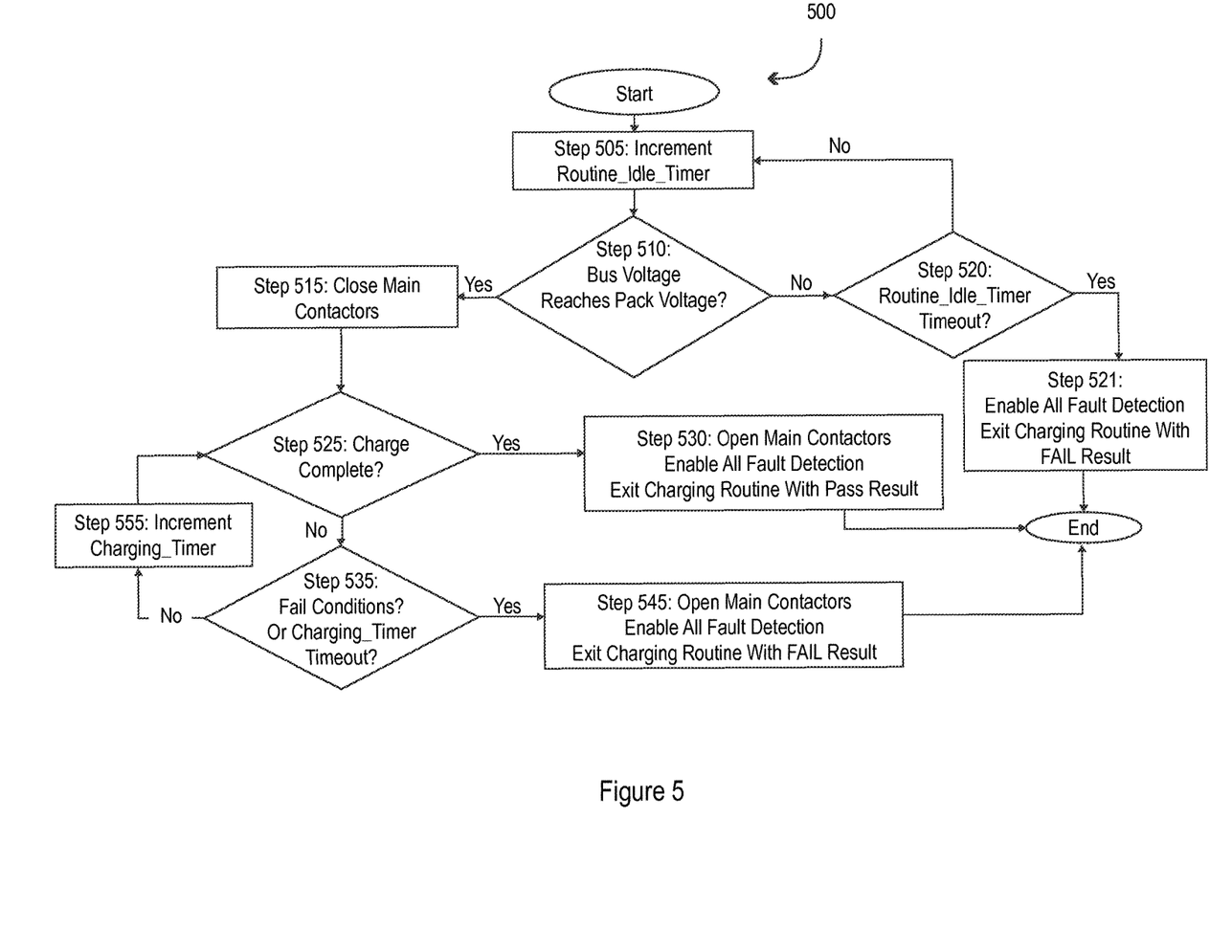
FIG. 5 illustrates a flow chart for a charging process.

FIG. 5 illustrates a process 500 for the battery charging procedure during the charging service routine.

At block 505, the battery 185 may increment the routine idle timer. At block 510, the battery controller 185 may determine if the charger 152 has charged up the bus voltage to reach to the battery pack voltage by comparing the measured bus voltage and battery pack voltage. The battery pack voltage may be a measured voltage. As described above with respect to step 335, the gateway 218 may request the charger component 204 to charge up to the bus voltage. During this time, the battery controller 185 compares the measured bus voltage and the battery pack voltage. If the bus voltage reaches the battery pack voltage, the process 500 may proceed to block 515. Otherwise, the process 500 may proceed to block 520.

At block 520, the battery controller 185 may check if the routine idle timer times out. If so, the process 500 may proceed to block 521. Otherwise, the process 500 may proceed to block 505. At block 521, the battery controller may first enable all fault detection, and then exit the charging routine. When the gateway 218 transmits charging status request message, the battery controller 185 will transmit negative response message with charging idle time too long indication.

At block 515, the battery controller 185 may close the main contactors, similar to step 348 in FIG. 3. At block 525, the battery controller 185 may verify if the charging is complete. One example of charge complete is the battery pack voltage reaches the voltage at the 50% battery SOC. If charging complete, the process 500 proceeds to block 530. If not, the process 500 proceeds to block 535.

At block 530, the battery controller 185 may open the main contactors, exit the charging routine with charging pass result, similarly to step 380 and 385 of FIG. 3. The process 500 may then end.

At block 535, the battery controller 185 may determine whether a certain condition (i.e. a fault or an invalid charging condition) has been detected or whether the charging timer has timed out. If the certain condition is recognized or charging timer is timed out, the process 500 proceeds to block 545. Otherwise, the process 500 proceeds to block 555.

At block 545, upon detection of a certain condition or charging timer timeout, the battery controller 185 may first open the main contactors inside the battery 115, then enable all fault detection (e.g., the battery over discharged faults, such as over discharged battery SoC and battery voltage, which are disabled upon entry the charging routine in FIG. 3 step 330, is re-enabled), and finally exit the charging routine. The process 600 may then end.

At block 555, the battery controller 185 increments the charging timer. The process 600 continues in the charging routine until charging is complete, or a certain condition is detected, or the charging timer is timed out.

Accordingly, a high-voltage charging system including an off-board charger is described herein. The gateway controller communicates with the battery controller to obtain the battery information, and instructs the charger component and the battery controller to perform charging automatically. The automatic charging and fault detection may make the off-board charger more user friendly. The disclosed charging routine may enable fault detection during charging even when cell voltages are much lower than the normal operating range. The feature may improve battery shelf life and the current off-shelf charger's charging ability.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle off-board charger comprising: a gateway configured to communicate with vehicle, to receive controller area network (CAN) information from a vehicle controller; and a high-voltage connector having a high-voltage interlock loop (HVIL) configured to connect to the vehicle via a cable and a HVIL loop cable and configured to cease power transfer to the vehicle in response to a predetermined voltage difference at a pair of ports of the HVIL connector.

2. The charger of claim 1, further comprising an electric vehicle supply equipment (EVSE) connector configured to receive AC power from an EVSE, wherein a charger component is configured to convert the received AC power to DC power.

3. The charger of claim 1, wherein the gateway is configured to receive the CAN information via an on-board diagnostic (OBD) cable configured to connect the gateway and the vehicle controller.

4. The charger of claim 1, further comprising a switch to power up the gateway and a charger component.

5. The charger of claim 4, further comprising a power supply port configured to receive power from an external power source upon activation of the switch.

6. The charger of claim 4, further comprising a fan to cool the charging component.

7. The charger of claim 1, further comprising a display configured to present information received from the gateway.

8. A vehicle charging system comprising:

a charger configured to receive power from an external power source; and a connector configured to receive power from the charger and transmit the received power to a vehicle via a cable, wherein the cable is configured to connect the connector to a vehicle battery and wherein each of the charger and the connector includes a high voltage interlock loop (HVIL) configured to cause the charger to cease power transfer upon recognizing a predetermined voltage difference at a pair of ports of the HVIL connector.

9. The system of claim 8, wherein the predetermined voltage difference indicates an un-seated connection.

10. The system of claim 8, further comprising a second high-voltage cable configured to transfer power from the connector to a vehicle battery at a vehicle connector, wherein the vehicle connector includes another HVIL.

11. The system of claim 10, wherein a recognition of a predetermined voltage difference at any one of the HVILs causes the charger to cease power transfer.

* * * * *